(12) United States Patent
Lakshminarayanan et al.

(10) Patent No.: US 11,036,492 B2
(45) Date of Patent: *Jun. 15, 2021

(54) DYNAMICALLY UPDATING SOURCE CODE FROM A CLOUD ENVIRONMENT

(71) Applicant: Bank of America Corporation, Charlotte, NC (US)

(72) Inventors: Balamurali Lakshminarayanan, Chennai (IN); Srinath Nelakuditi, Hyderabad (IN); Mohana Madhuri Patri, Hyderabad (IN); Kalyan Chakravarthy Pallapolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/828,703

(22) Filed: Mar. 24, 2020

(65) Prior Publication Data
US 2020/0225932 A1 Jul. 16, 2020

Related U.S. Application Data

(63) Continuation of application No. 16/243,847, filed on Jan. 9, 2019, now Pat. No. 10,635,431.

(51) Int. Cl.
| | |
|---|---|
| *G06F 9/44* | (2018.01) |
| *G06F 8/65* | (2018.01) |
| *G06N 20/00* | (2019.01) |
| *H04L 29/08* | (2006.01) |
| *G06F 8/654* | (2018.01) |

(52) U.S. Cl.
CPC .............. *G06F 8/65* (2013.01); *G06N 20/00* (2019.01); *H04L 67/10* (2013.01); *G06F 8/654* (2018.02); *G06F 8/66* (2013.01)

(58) Field of Classification Search
None
See application file for complete search history.

(56) References Cited

U.S. PATENT DOCUMENTS

| | | | |
|---|---|---|---|
| 8,387,014 B2* | 2/2013 | Plante | G06F 8/71 717/122 |
| 8,805,783 B2* | 8/2014 | Muhunthan | G06F 16/27 707/626 |
| 9,323,513 B2 | 4/2016 | Pillay et al. | |
| 9,465,829 B2* | 10/2016 | Faerber | G06F 16/2228 |
| 9,473,356 B2 | 10/2016 | Goetsch | |
| 9,632,771 B2 | 4/2017 | Toub | |
| 9,898,269 B2 | 2/2018 | Pillay et al. | |
| 2005/0259693 A1* | 11/2005 | Auriemma | G06F 16/258 370/503 |
| 2017/0277742 A1* | 9/2017 | Arkhipova | G06F 16/275 |
| 2018/0121293 A1* | 5/2018 | Phillips | G06F 11/1451 |

* cited by examiner

*Primary Examiner* — Wei Y Zhen
*Assistant Examiner* — Lanny N Ung
(74) *Attorney, Agent, or Firm* — Michael A. Springs (57) ABSTRACT

A code merging system is configured to manage the storage of source code on a local system in the software development cycle. A cloud environment hosts working source code, which is composed of metadata artifact components. Copies of some of the metadata artifact components are transferred to a source code control and merged with master source code in either a partial merge process or a full merge process.

20 Claims, 8 Drawing Sheets

WORKFLOW TEMPLATE

```xml
<?XML VERSION="1.0" encoding="UTF-8"?>
<Workflow xmlns="http://soap.sforce.com/2006/04/metadata">
  <alerts>
    <fullName>CB_KeepInformed</fullName>
    <description>CB Keep Informed</description>
    <protected>false</protected>
    <recipients>
       <field>RecipientUserId_c</field>
       <type>userLookup</type>
    </recipients>
    <senderAddress>test@bankofamerica.com</senderAddress>
    <senderType>OrgWideEmailAddress</senderType>
    <template>HLS_Emails/HLS_CBNotifyUser</template>
  </alerts>
  <alerts>
    <fullName>CB_KeepInformedAboutEMD</fullName>
    <description>CB Keep Informed About EMD</description>
    <protected>false</protected>
    <recipients>
       <field>RecipientUserId_c</field>
       <type>userLookup</type>
    </recipients>
    <senderAddress>test@bankofamerica.com</senderAddress>
    <senderType>OrgWideEmailAddress</senderType>
    <template>HLS_Emails/HLS_CBNotifyUserAboutEMD</template>
  </alerts>
</workflow>
```

PROFILE TEMPLATE

```xml
<?XML VERSION="1.0" encoding="UTF-8"?>
<Profile xmlns="http://soap.sforce.com/2006/04/metadata">
 <classAccesses>
    <apexClass>DocumentTypeRelatedCasesController</apexClass>
    <enabled>true</enabled>
  </classAccesses>
 <objectPermissions>
    <allowCreate>false</allowCreate>
    <allowDelete>false</allowDelete>
    <allowEdit>false</allowEdit>
    <allowRead>true</allowRead>
    <modifyAllRecords>false</modifyAllRecords>
    <object>E_CustomerActivityOption_c</object>
    <viewAllRecords>false</viewAllRecords>
 </objectPermissions>
 <objectPermissions>
    <allowCreate>true</allowCreate>
    <allowDelete>true</allowDelete>
    <allowEdit>true</allowEdit>
    <allowRead>true</allowRead>
    <modifyAllRecords>true</modifyAllRecords>
    <object>CustomerFileShare_c</object>
    <viewAllRecords>true</viewAllRecords>
 </objectPermissions>
    <pageAccesses>
    <apexPage>DocumentTypeRelatedCases</apexPage>
    <enabled>true</enabled>
   </pageAccesses>
 </Profile>
```

322 brace around first objectPermissions block; 324 brace around inner allow/modify/object/view lines.

EMAIL TEMPLATE

```
<table border="0" cellpadding="5" width="550" cellspacing="5" height="400">
<tr valign="top" height="400">
<td tEdit="clrl" style=" background-color:#FFFFFF; color:#000000; bEditID:r3stl; bLabel:main; font-size12pt; font-family:arial;" aEdit="clrl" locked="0">
<![CDATA[content]]></td>
</tr>
</table>
```

DYNAMICALLY UPDATING SOURCE CODE FROM A CLOUD ENVIRONMENT

CROSS-REFERENCE TO RELATED APPLICATIONS

This application is a continuation of U.S. patent application Ser. No. 16/243,847 filed Jan. 9, 2019, by Balamurali Lakshminarayanan et al., and entitled "DYNAMICALLY UPDATING SOURCE CODE FROM A CLOUD ENVIRONMENT," which is incorporated herein by reference.

TECHNICAL FIELD

The present disclosure relates generally to data processing, and more specifically to updating a locally stored source code with developments that are made in a cloud computing environment.

BACKGROUND

A large portion of all software development now takes place in cloud computing environments. These environments permit developers to continuously update and test projects in a decentralized manner. Problems arise when development takes place in the cloud and a master copy of the source code is stored and implemented on local systems. Updating the local copy of source code consumes large amounts of bandwidth. Because the code is under continuous development in the cloud, updates to the local copy must occur frequently. The result is that local systems must dedicate significant computing resources just to maintain the source code. Methods that try to reduce the bandwidth requirements by only updating portions of the source code rather than uploading a new copy create further problems associated with updating the incorrect source code, which results in errors in the computing system when the source code is attempted to be run. This causes the underlying computing systems to malfunction and potentially crash.

Source code components often depend on each other for functionality. In other words, some components of a computer program will not be able to run if specific other components of that program are not already updated. Conventional source code merging methods merge components as they are received. For a large volume of source code, that can mean that a first component that cannot function without reference to a second component might be merged before that second component is updated. The result is that the merged code cannot be executed on a computer system until the second component is also merged. Alternatively, the computer system may malfunction or crash when attempting to run the improperly merged source code. Current merging methods are also prone to inserting code fragments in the wrong location of the computer program. This can lead to a computer system malfunction or crash when the source code is implemented.

SUMMARY

The system described in the present disclosure provides a technical solution to the technical problems discussed above by enabling a computing device to selectively merge, on a component-by-component basis, code from working source code to master source code by resolving component dependencies and pre-structuring the components prior to merging. The disclosed system provides several technical advantages, which include but are not limited to: 1) enabling computing devices to determine individual component changes that will be made to update master source code with working source code; 2) enabling computing devices to resolve dependencies among components of the source code; 3) enabling computing devices to merge two copies of source code in either a full merge process or a partial merge process using metadata templates; and 4) providing the ability to merge code between two copies of source code while the source code is deployed on a local system. By implementing these techniques to faithfully merge working source code into master source code, the present disclosure deters computer system performance degradation, malfunctions, and crashes that result from erroneous source code. This improves the operational stability of the computer system.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 3A-D are embodiments of a metadata template that can be used in the cloud fusion system of FIG. 1;

DETAILED DESCRIPTION

Figure 1:
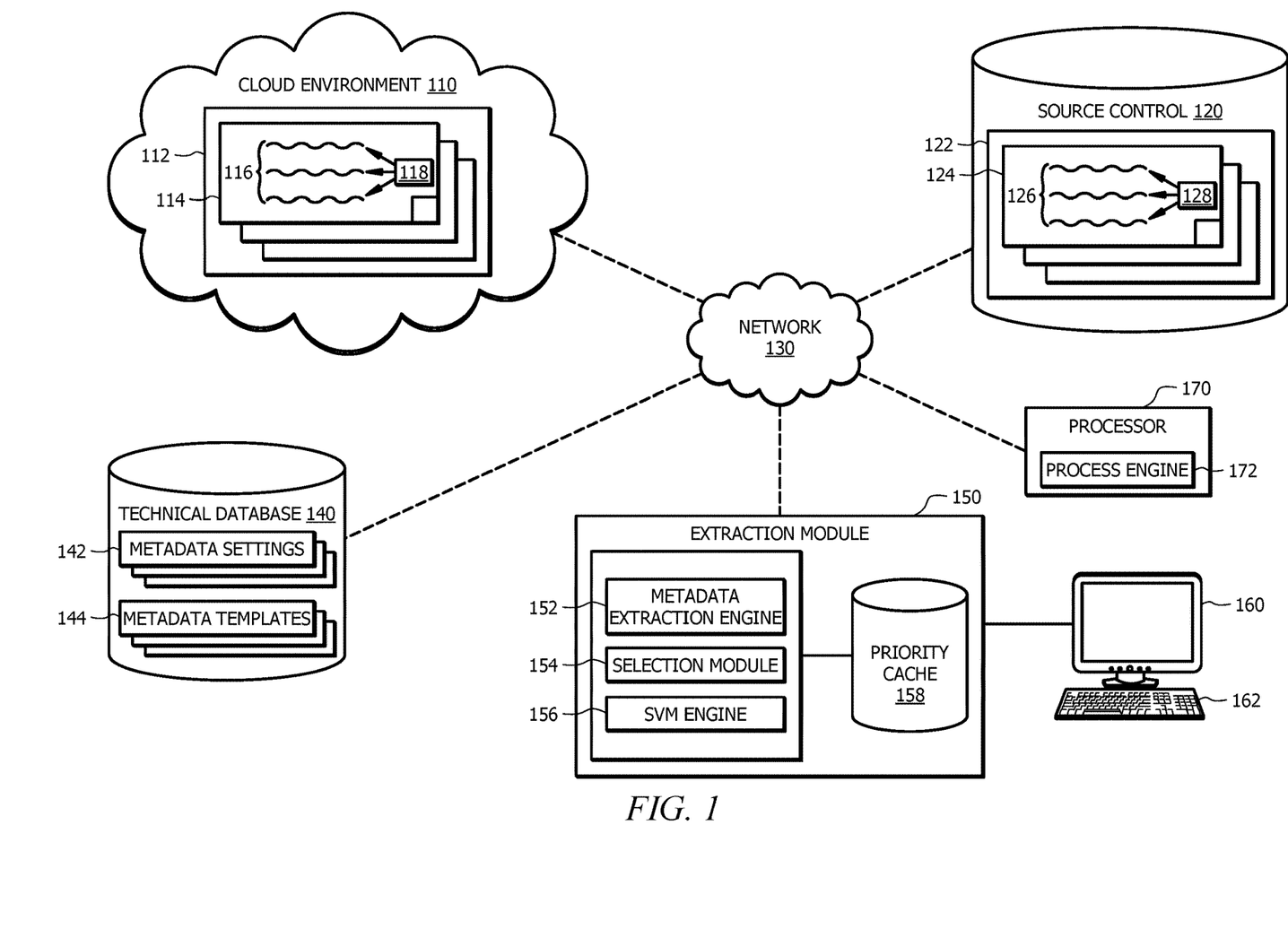
FIG. 1 is a diagram of an embodiment of a cloud fusion system.

FIG. 1 is a diagram of an embodiment of cloud fusion system 100. The cloud fusion system 100 is generally configured to manage the storage of source code on a local system during the software development cycle. Cloud environment 110 hosts a working source code 112, which is composed of metadata artifact components 114. Copies of some of the metadata artifact components 114 are transferred to source control 120 and merged with master source code 122. Cloud environment 110 connects to source control 120 through network 130. The transfer and merging of metadata artifact components 114 to source control 120 is facilitated by a technical database 140, a computer 160 that implements an extraction module 150, and a processor 170 that implements a process engine 172.

Cloud Environment

Figure 5A:
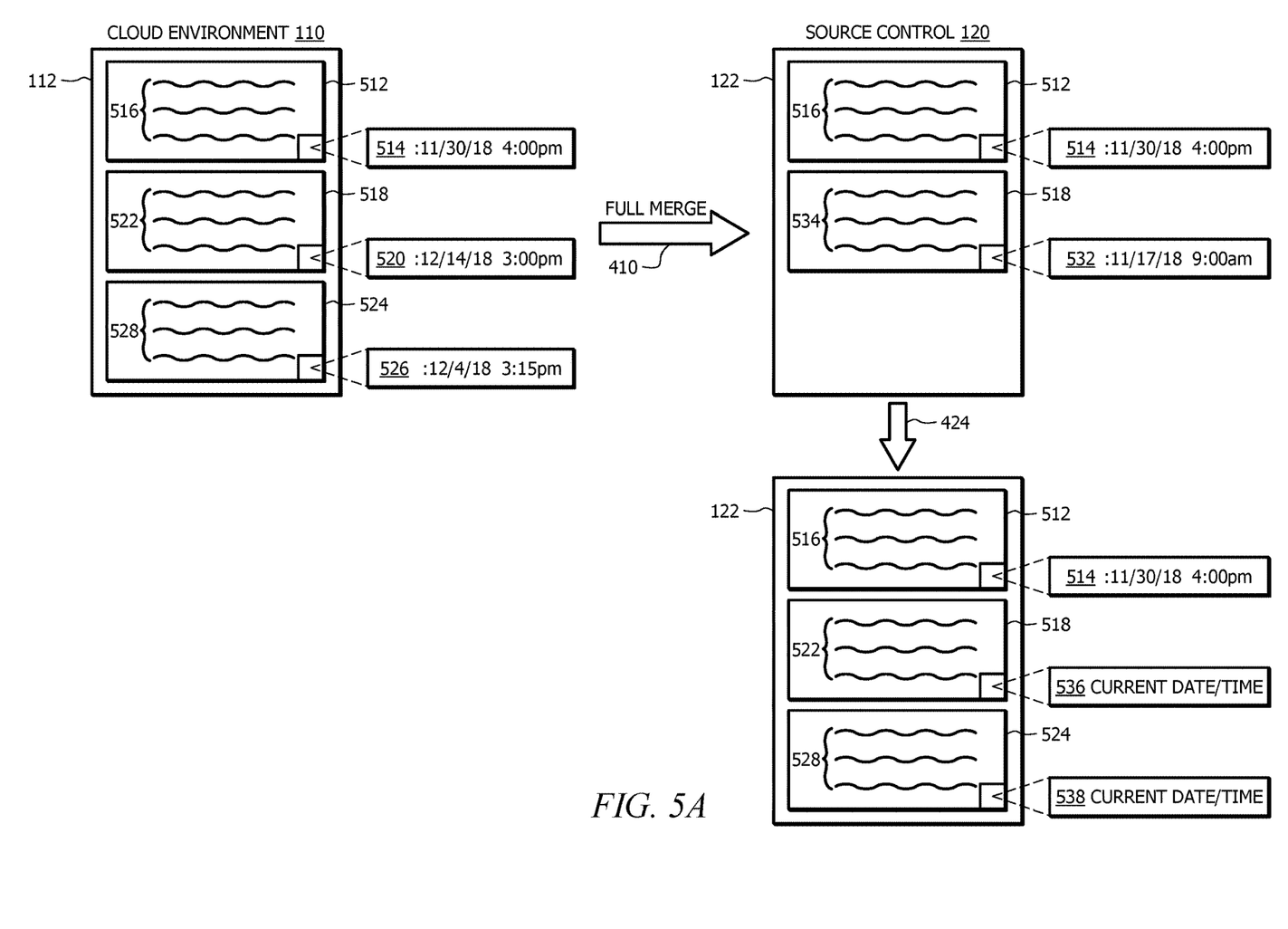
FIGS. 5A-B are diagrams illustrating the difference between a partial merge operation and a full merge operation performed in the process of FIG. 4.
Figure 5B:
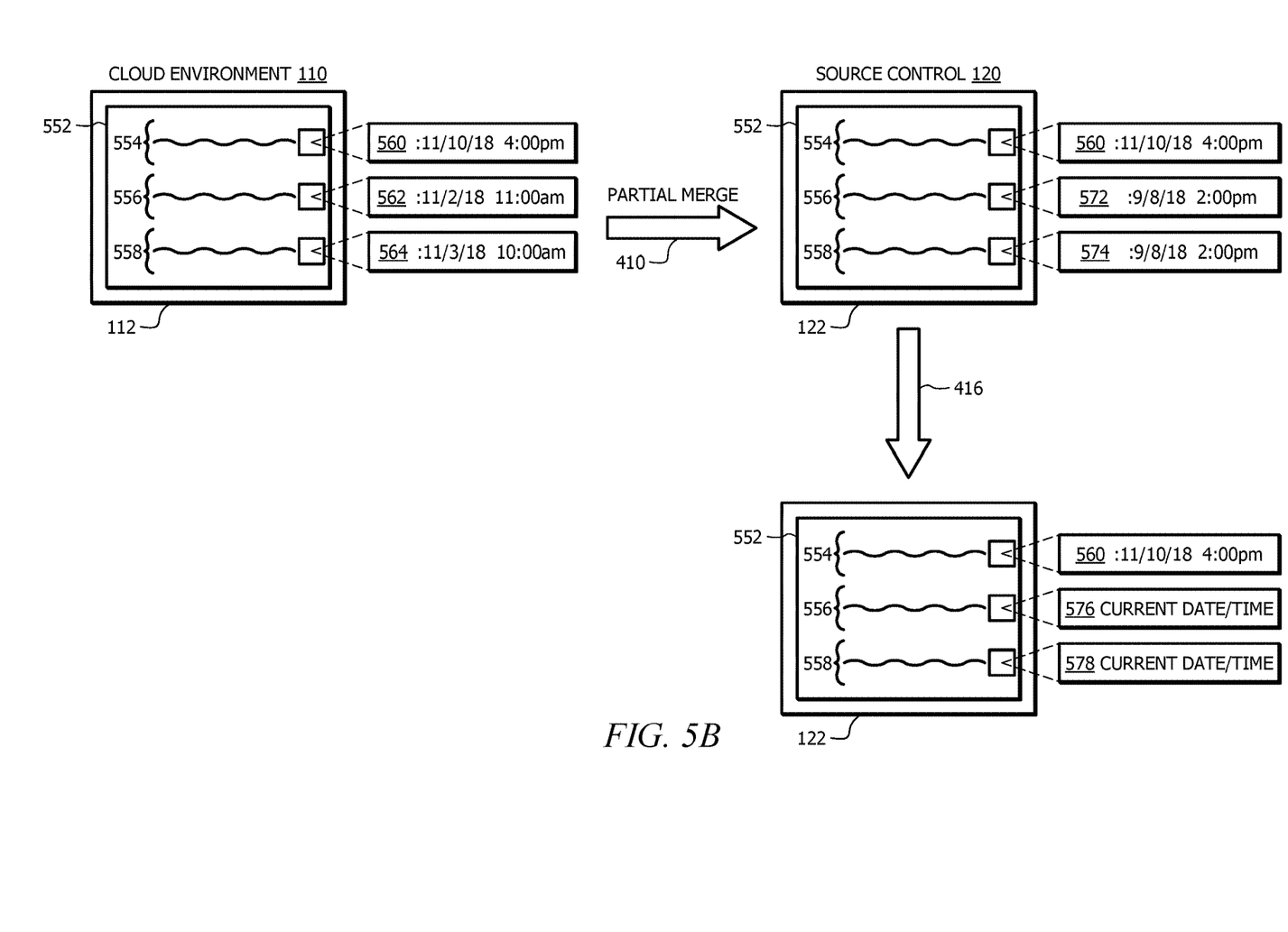

Cloud Environment 110 represents a development environment for working source code 112. Working source code 112 is a library of text commands that may be compiled or assembled into an executable computer program. It is the copy of code that is created and/or modified during a development process. Working source code 112 is comprised of a plurality of metadata artifact components 114. Metadata artifact components 114 are comprised of a plurality of subcomponents 116 that define the traits and functionality of working source code 112. Examples of metadata artifact components 114 include, but are not limited to, an object, profile, class, page, trigger, permission set, layout, home page component, and email. Subcomponents can comprise, for example, fields within an object or permissions related to fields. A timestamp 118 is associated with each subcomponent 116 of metadata artifact component 114 to indicate when it was last modified in cloud environment 110. Further reference to the working source code 112 and the relationship between timestamp 118 and subcomponents 116 is made below with respect to FIG. 5.

Because the working source code 112 is hosted in cloud environment 110, a group of users can develop software in a decentralized manner. Any number of users can be granted access to the cloud environment 110 for development purposes. Users can modify the working source code 112 simultaneously. Additionally, cloud environment 110 enables users to access systems and software independent of where that user is located.

Cloud environment 110 is generally a network device configured to collect and store information linked with different users. For example, the cloud environment 110 may be a server configured to operate as a software as a service (SaaS) server, a web server, a database, a file repository, a file hosting server, or any other suitable web-enabled server. The cloud environment 110 is configured to host and/or is linked with one or more user accounts. Examples of accounts include, but are not limited to, online accounts, subscription services, social media accounts, product accounts, financial accounts, and/or any other suitable type of web-enabled accounts.

Source Control

Source control 120 represents a production environment for master source code 122. Master source code 122 is a saved version of working source code 112. Master source code 122 receives code updates from working source code 112 rather than from users of system 100. In one embodiment, this production environment is the live version of working source code 112. In other words, source control 120 may be the location where a version of working source code 112 gets executed. Alternatively, source control 120 may serve merely as a local repository for working source code 112 in the form of master source code 122.

Master source code 122 is comprised of a plurality of metadata artifact components 124. The metadata artifact components 124 are comprised of a plurality of subcomponents 126 that define the traits and functionality of master source code 122. Examples of metadata artifact components 124 include, but are not limited to, an object, profile, class, page, trigger, permission set, layout, home page component, and email. Subcomponents can comprise, for example, fields within an object or permissions related to fields. The metadata artifact components 124 may be of the same type as the metadata artifacts 114, but the subcomponents 126 may not be the same as subcomponents 116. A timestamp 128 is associated with each subcomponent 126 of metadata artifact component 124 that indicates when it was last modified in source control 120. Further reference to the master source code 122 and the relationship between timestamp 128 and subcomponents 126 is made below with respect to FIG. 5.

The source control 120 represents any suitable combination of hardware and software configured to store data. The components of source control 120 may comprise volatile memory and/or non-volatile memory. A volatile memory medium may include volatile storage. For example, the volatile storage may include random access memory (RAM), dynamic RAM (DRAM), static RAM (SRAM), and/or extended data out RAM (EDO RAM), among others. In one or more embodiments, a non-volatile memory may include non-volatile storage. For example, the non-volatile storage may include read only memory (ROM), programmable ROM (PROM), erasable PROM (EPROM), electrically erasable PROM (EEPROM), a magnetic storage medium (e.g., a hard drive, a floppy disk, a magnetic tape, etc.), ferroelectric RAM (FRAM), flash memory, a solid state drive (SSD), non-volatile RAM (NVRAM), a one-time programmable (OTP) memory, and/or optical storage (e.g., a compact disc (CD), a digital versatile disc (DVD), a BLU-RAY disc (BD), etc.), among others. The term "memory medium" may mean a "memory device," a "memory," a "storage device," a "tangible computer readable storage medium," and/or a "computer-readable medium."

Network

The components of system 100 are in signal communication through network 130. Network 130 includes any suitable networks operable to support communication between components of system 100. Network 130 may include any type of wired or wireless communication channel capable of coupling together computing nodes. Network 130 may include any interconnecting system capable of transmitting audio, video, electrical signals, optical signals, data, messages, or any combination of the preceding. Network 130 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100. Network 130 may be configured to support any communication protocols as would be appreciated by one of ordinary skill in the art upon viewing this disclosure.

Technical Database

Technical database 140 comprises one or more disks, tape drives, or solid-state drives, and may be used to store instructions and data that are read during program execution. Technical database 140 may be volatile or non-volatile and may comprise read-only memory (ROM), random-access memory (RAM), ternary content-addressable memory (TCAM), dynamic random-access memory (DRAM), and static random-access memory (SRAM). Technical database 140 is operable to store metadata settings 142 and metadata templates 144.

Figure 2:
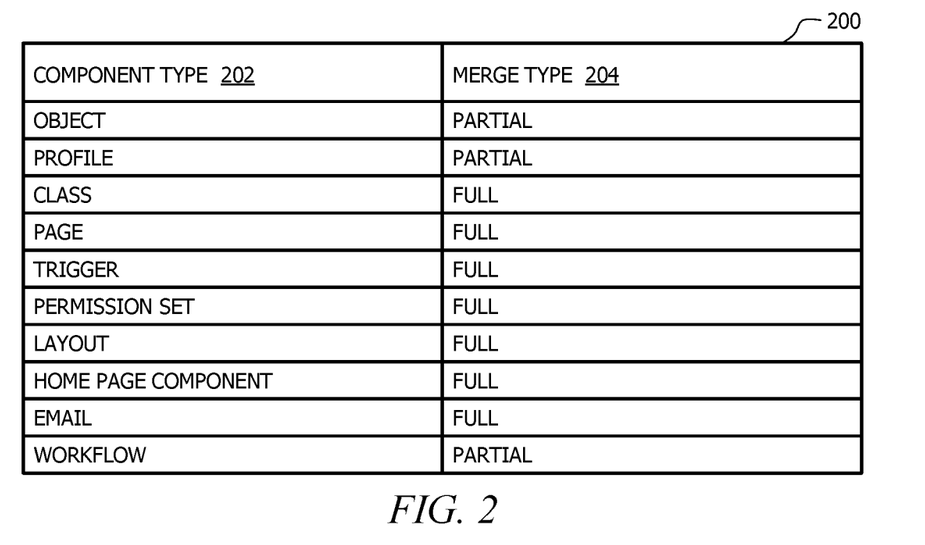
FIG. 2 is a table of an embodiment of metadata settings that can be used in the cloud fusion system of FIG. 1.

Metadata settings 142 include predefined configurations for how a metadata artifact component 114 should be merged with master source code 122. For example, FIG. 2 shows a metadata settings table 200 for a metadata setting 142. Metadata settings table 200 contains a list of component types 202. Each component type 202 is assigned a corresponding merge type 204. Merge type 204 can either be full, wherein every subcomponent 116 of a metadata artifact component 114 replaces the subcomponents 126 in a corresponding metadata artifact component 124, or partial, wherein only some of the subcomponents 116 replace corresponding subcomponents 126 in a corresponding metadata artifact component 124. Further reference to what constitutes a partial merge and what constitutes a full merge is made below in reference to FIG. 5.

Referring back to FIG. 1, metadata templates 144 are predefined object templates that, when applied to a specific metadata artifact component 114, facilitates the merging of that component with master source code 122. The metadata templates 144 provide information about where to merge a given metadata artifact component 114 into master source code 122. The metadata templates 114 also provide the appropriate structure and formatting to successfully merge a given metadata artifact component 114 into master source code 122. FIGS. 3A-C provide examples of templates for a component that is assigned a merge type 204 of partial, and FIG. 3D provides an example of a template for a component that is assigned a merge type 204 of full.

Figure 3A:
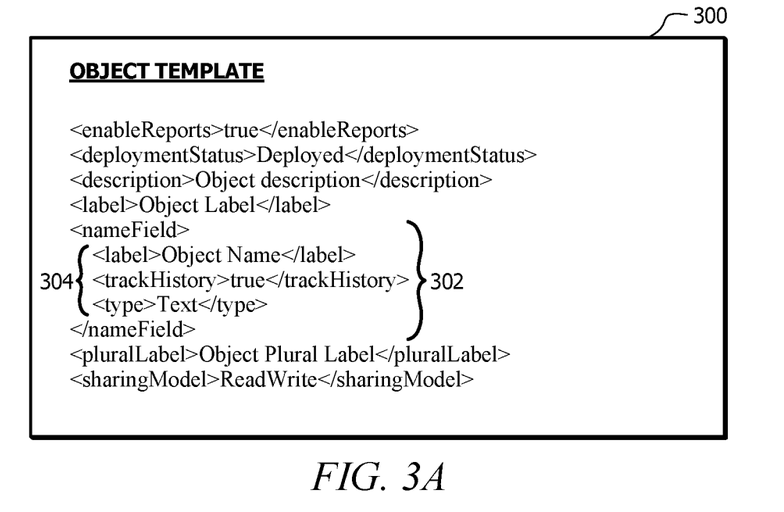
Figure 3B:
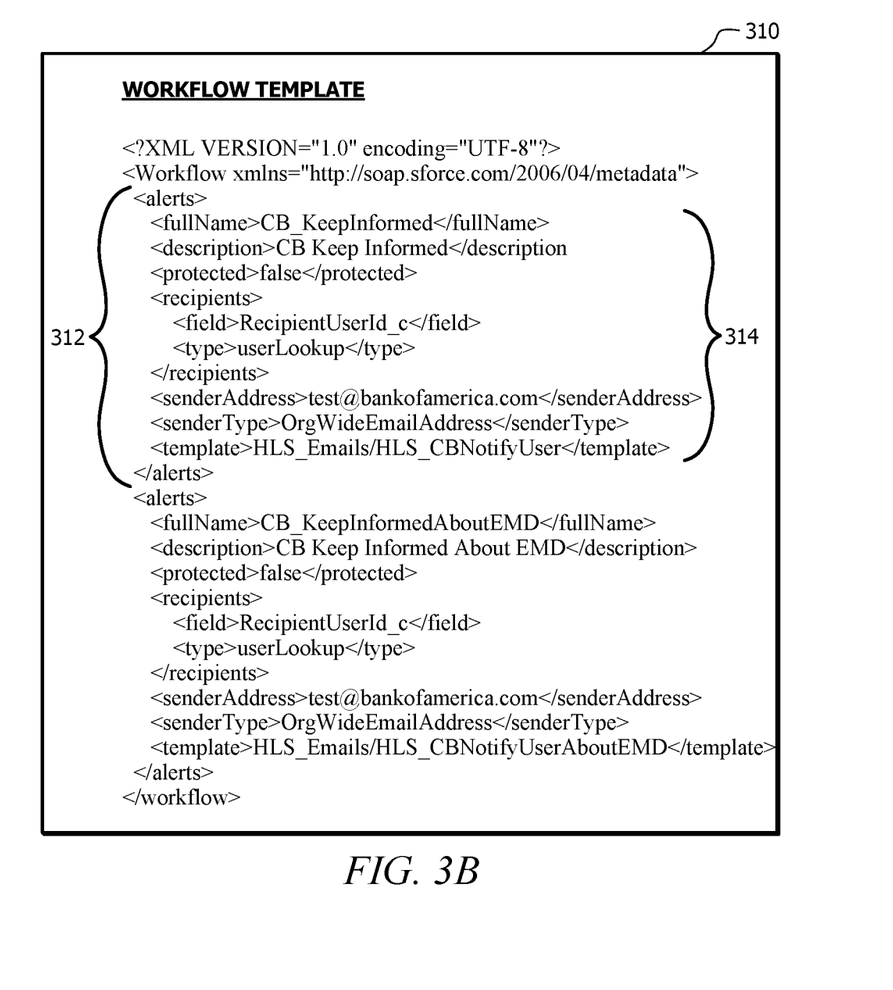

For example, FIG. 3A illustrates an object template 300. This template can be used when the metadata artifact component 114 is an object component. Each name field 302 represents a different metadata artifact component 114. The name field 302 is populated with subcomponents 304. The subcomponents 304 represent formatted copies of the subcomponents 116 that will be merged with master source code 122. While only three subcomponents 304 are shown, it should be appreciated that the number of subcomponents can be greater or fewer than that shown. Further, different subcomponents may be included in the template 300 depending on the needs of the project. In another embodiment, the object template 300 can comprise a plurality of name fields 302, each assigned for a different metadata artifact component 114.

FIG. 3B illustrates a workflow template 310. This template can be used when the metadata artifact component 114 is a workflow component. Each alert field 312 represents a different metadata artifact component 114. The alert field 312 is populated with subcomponents 314. The subcomponents 314 represent formatted copies of the subcomponents 116 that will be merged with master source code 122. It should be appreciated that the number of subcomponents 314 can be greater or fewer than that shown. Further, different subcomponents 314 may be included in the template 310 depending on the needs of the project. As shown in FIG. 3B, there can be multiple alert fields 312 for multiple metadata artifact components 114. Alternative embodiments may only include a single alert field 312.

FIG. 3C illustrates a profile template 320. This template can be used when the metadata artifact component 114 is a profile component. Each object permissions field 322 represents a different metadata artifact component 114. The object permissions field 322 is populated with subcomponents 324. The subcomponents 324 represent formatted copies of the subcomponents 116 that will be merged with master source code 122. It should be appreciated that the number of subcomponents 324 can be greater or fewer than shown. Further, different subcomponents 324 may be included in the template 320 depending on the needs of the project. There can be multiple object permission fields 322 for multiple metadata artifact components 114. Alternative embodiments may only include a single object permissions field 322.

FIG. 3D illustrates an email template 330. This template can be used when the metadata artifact component 114 is an email. The syntax of this template differs from that of FIGS. 3A-C because this template corresponds to a different merge type. Referring back to the metadata settings table 200 in FIG. 2, the object, workflow, and profile templates of FIGS. 3A-C correspond to partial merge operations. Metadata setting table 200 shows that, in this example, an email component type undergoes a full merge operation. This difference manifests itself in FIG. 3D with a lack of individual subcomponents populating the fields, as the entire metadata artifact component 114 would be merged.

Extraction Module

Returning to FIG. 1, extraction module 150 includes metadata extraction engine 152, selection module 154, semi-supervised machine learning (SVM) engine 156, and priority cache 158. Extraction module 150 is implemented on processor 162, which may reside on computer 160. Examples of computer 160 include, but are not limited to, desktop computers, mobile phones, tablet computers, laptop computers, or other special purpose computer platforms.

Processor 162 is any electronic circuitry, including, but not limited to microprocessors, application specific integrated circuits (ASIC), application specific instruction set processor (ASIP), and/or state machines, that communicatively couples to network 130. Processor 162 may be 8-bit, 16-bit, 32-bit, 64-bit or of any other suitable architecture. Processor 162 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 162 may include other hardware and software that operates to control and process information. Processor 162 executes software stored on memory to perform any of the functions described herein. Processor 162 controls the operation of extraction module 150 by processing information received from other components of system 100. Processor 162 may be a programmable logic device, a microcontroller, a microprocessor, any suitable processing device, or any suitable combination of the preceding. Processor 162 is not limited to a single processing device and may encompass multiple processing devices, including any number of servers.

Metadata extraction engine 152 is an application that is implemented on processor 162 and configured to read and analyze code stored in cloud environment 110. Metadata extraction engine 152 can be further configured to determine whether a given metadata artifact component 114 needs to undergo a full merge operation or a partial merge operation with master source code 122. Metadata extraction engine 152 is further configured to resolve dependencies between different metadata artifact components 114 and between different subcomponents 116 that need to be merged with master source code 122.

In some embodiments, extraction module 150 includes a selection module 154. Selection module 154 is an application that is implemented on processor 162 and configured to receive input from a user, through computer 160, as to which subcomponents 116 of metadata artifact components 114 will be merged with master source code 122. For example, a user can populate a table, such as the one shown in FIG. 2, with a list of component types and then assign whether each type will undergo full or partial merge operations. A user can further use selection module 154 to define how the system is to deal with new types of metadata that the user did not program into the system. For example, a user could program system 100 to send the user an alert through computer 160 when system 100 receives a component type 202 that it does not recognize. The user can then use selection module 154 to update the list of component types 202 and the assigned merge types 204 for those component types 202.

SVM engine 156 is an application that is implemented on processor 162 and generally configured to use a semi-supervised machine learning algorithm for training metadata extraction engine 152 to recognize different types of metadata artifact components. Additionally, SVM engine 156 is configured to analyze new types of metadata artifact components 114 as they are received by extraction module 150 and construct new metadata templates 144 for that type of component.

Priority cache 158 represents any suitable combination of hardware and software configured to store data. The components of priority cache 158 may comprise volatile memory and/or non-volatile memory. A volatile memory medium may include volatile storage. For example, the volatile storage may include random access memory (RAM), dynamic RAM (DRAM), static RAM (SRAM), and/or extended data out RAM (EDO RAM), among others. In one or more embodiments, a non-volatile memory may include non-volatile storage. For example, the non-volatile storage may include read only memory (ROM), programmable ROM (PROM), erasable PROM (EPROM), electrically erasable PROM (EEPROM), a magnetic storage medium (e.g., a hard drive, a floppy disk, a magnetic tape, etc.), ferroelectric RAM (FRAM), flash memory, a solid state drive (SSD), non-volatile RAM (NVRAM), a one-time programmable (OTP) memory, and/or optical storage (e.g., a compact disc (CD), a digital versatile disc (DVD), a BLU-RAY disc (BD), etc.), among others. The term "memory medium" may mean a "memory device," a "memory," a "storage device," a "tangible computer readable storage medium," and/or a "computer-readable medium."

In one example, a memory medium may be a volatile memory medium. For instance, a volatile memory medium may lose stored data when the volatile memory medium no longer receives power. In a second example, a memory medium may be a non-volatile memory medium. For instance, the non-volatile memory medium may not lose stored data when the volatile memory medium no longer receives power or when power is not applied. In another example, a memory medium may include a volatile memory medium and a non-volatile memory medium.

Process Engine

Process engine 172 is an application implemented on processor 170 and configured to merge the selected subcomponents 116 of metadata artifact components 114 with master source code 122. Processor 170 is any electronic circuitry, including, but not limited to microprocessors, application specific integrated circuits (ASIC), application specific instruction set processor (ASIP), and/or state machines, that communicatively couples to system 100. Processor 170 may be 8-bit, 16-bit, 32-bit, 64-bit or of any other suitable architecture. Processor 170 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 170 may include other hardware and software that operates to control and process information. Processor 170 executes software stored on memory to perform any of the functions described herein. Processor 170 controls the operation of process engine 172 by processing information—namely, the determination of whether a partial merge or full merge should be performed—received from extraction module 150. Processor 170 may be a programmable logic device, a microcontroller, a microprocessor, any suitable processing device, or any suitable combination of the preceding. Processor 170 is not limited to a single processing device and may encompass multiple processing devices. In one embodiment, processor 170 is the same as processor 162.

System Operation Overview

The following is a non-limiting overview of how the cloud fusion system 100 operates. Additional details about the metadata extraction engine 152, the selection module 154, the SVM engine 156, and the process engine 172 are provided below.

The cloud fusion system 100 uses SVM engine 156 to teach extraction engine 152 how to process different types of metadata artifact components 114. SVM engine 156 is generally configured to use a semi-supervised machine learning algorithm for training metadata extraction engine 152 to recognize different types of metadata artifact components 114 and to determine whether every subcomponent 116 of a given metadata artifact component 114 must be updated in master source code 122 when changes are made to the working source code 112. Additionally, SVM engine 156 is configured to analyze new types of metadata artifact components 114 as they are received by extraction module 150 and construct new metadata templates 144 for that type of component. For example, SVM engine 156 might receive a workflow component of a metadata artifact 114 when technical database 140 does not contain a metadata template 144 for a workflow component. After analyzing the component, SVM engine 156 compares the component to the structure of master source code 122 and generates a template like that of FIG. 3B.

Metadata extraction engine 152 is used to determine which metadata artifact components 114 need to be merged with master source code 122 located in source control 120. Metadata extraction engine 152 is configured to read and analyze code stored in cloud environment 110. In one embodiment, metadata extraction engine 152 is configured to read a timestamp 118 for each subcomponent 116 of metadata artifact components 114 that indicate when the subcomponents 116 were last updated. Metadata extraction engine 152 then compares the timestamps 118 to timestamps 128, which are timestamps indicating when the subcomponents 126 of metadata artifact components 124 were last updated in master source code 122. If the timestamp 118 is more recent than the timestamp 128, metadata extraction engine 152 determines that the subcomponent 116 associated with that timestamp 118 needs to be merged with master source code 122. Further details on what is meant by merging with master source code 122 is given below with respect to FIG. 5.

Metadata extraction engine 152 is further configured to determine whether each of the metadata artifact components 114 that need to merge with master source code 122 should undergo a partial merge operation or a full merge operation. For example, metadata extraction engine 152 may read one of the metadata artifact components 114 and recognize, based on the training of SVM engine 156, that it is a profile type. Metadata extraction engine 152 then searches technical database 140 to determine the appropriate metadata settings 142. Referring to FIG. 2, the metadata extraction engine 152 would determine that a component type 202 of profile would have a merge type 204 of partial.

Optionally, selection module 154 lets users manually select which subcomponents 116 of metadata artifact components 114 should be extracted and whether a given metadata artifact 114 will undergo a partial merge operation or a full merge operation.

Metadata extraction engine 152 also resolves dependencies among the various metadata artifact components 114 and among individual subcomponents 116 of a given metadata artifact component 114 prior to merging them with master source code 122. Metadata artifact components 114 and subcomponents 116 that depend upon the implementation of other metadata artifact components 114 and subcomponents 116 are copied by metadata extraction engine 152 and sent to priority cache 158. Those metadata artifact components 114 that do not depend on the implementation of other metadata artifact components 114 are copied by metadata extraction engine 152 and sent to process engine 172. The dependent metadata artifact components 114 stay in priority cache 158 until process engine 172 is finished merging the first batch of metadata artifact components 114 sent by metadata extraction engine 152. Transfer of the copies of metadata artifact components 114 continues in this level-by-level manner until each level of dependency is merged with master source code 122.

For example, if a first metadata artifact component 114 depends on the implementation of a second metadata artifact component 114, then metadata extraction engine 152 will give the second metadata artifact component 114 a lower priority value. If the second metadata artifact component 114 depends on the implementation of a third metadata artifact component 114, then metadata extraction engine 152 will give the third metadata artifact component 114 a lower priority value than that of the second metadata artifact component 114. Metadata extraction engine 152 continues this analysis until it finds the metadata artifact component 114 with the highest priority value in each dependent chain. A copy of the metadata artifact components 114 with the highest priority value are sent to process engine 172. Metadata extraction engine 152 then sends a copy of the metadata artifact components 114 with lower priority values to priority cache 158.

When process engine 172 receives a set of subcomponents 116 of a metadata artifact component 114, it also receives the metadata settings 142 for each metadata artifact component 114 sent by metadata extraction engine 152. Process engine 172 uses this information to search technical database 140 for an appropriate metadata template 144 to apply to the subcomponent 116. For example, process engine 172 might receive a series of subcomponents 116 that were determined to have a component type 202 of workflow and a merge type 204 of partial. Using this information, process engine 172 searches the technical database 140 and finds the workflow template 300 depicted in FIG. 3B. Process engine 172 then populates the appropriate alert field 312 with the subcomponents 116.

Process engine 172 then merges the templated components and subcomponents with master source code 122 located in source control 120. After process engine 172 completes this process for a first wave of metadata artifact components 114, process engine 172 retrieves metadata artifact components 114 and subcomponents 116 from priority cache 158 that depend directly on the metadata artifact components 114 and subcomponents 116 just merged with master source code 122. Process engine 172 then selects and applies the appropriate metadata template 144 and merges the templated components and subcomponents with master source code 122 as before. Process engine 172 is configured to repeat this process until all of the subcomponents 116 or full metadata artifact components 114 that were stored in priority cache 158 are merged with master source code 122 in order of priority.

When process engine 172 completes all merge operations, it validates the merging operations. Validation involves comparing the updated timestamps 128 in the master source code 122 with the timestamps 118 in the working source code 112. A successful merge will result in the timestamps 128 and 118 having the same date and time. If errors occur in the merging operation, process engine 172 modifies the copy of metadata template 142 used with the erroneously merged metadata artifact 114 or subcomponents 116 and sends the modified template 144 to technical database 140. Process engine 172 then causes system 100 to restart the process until the merging operations are validated.

Merging Process

Figure 4:
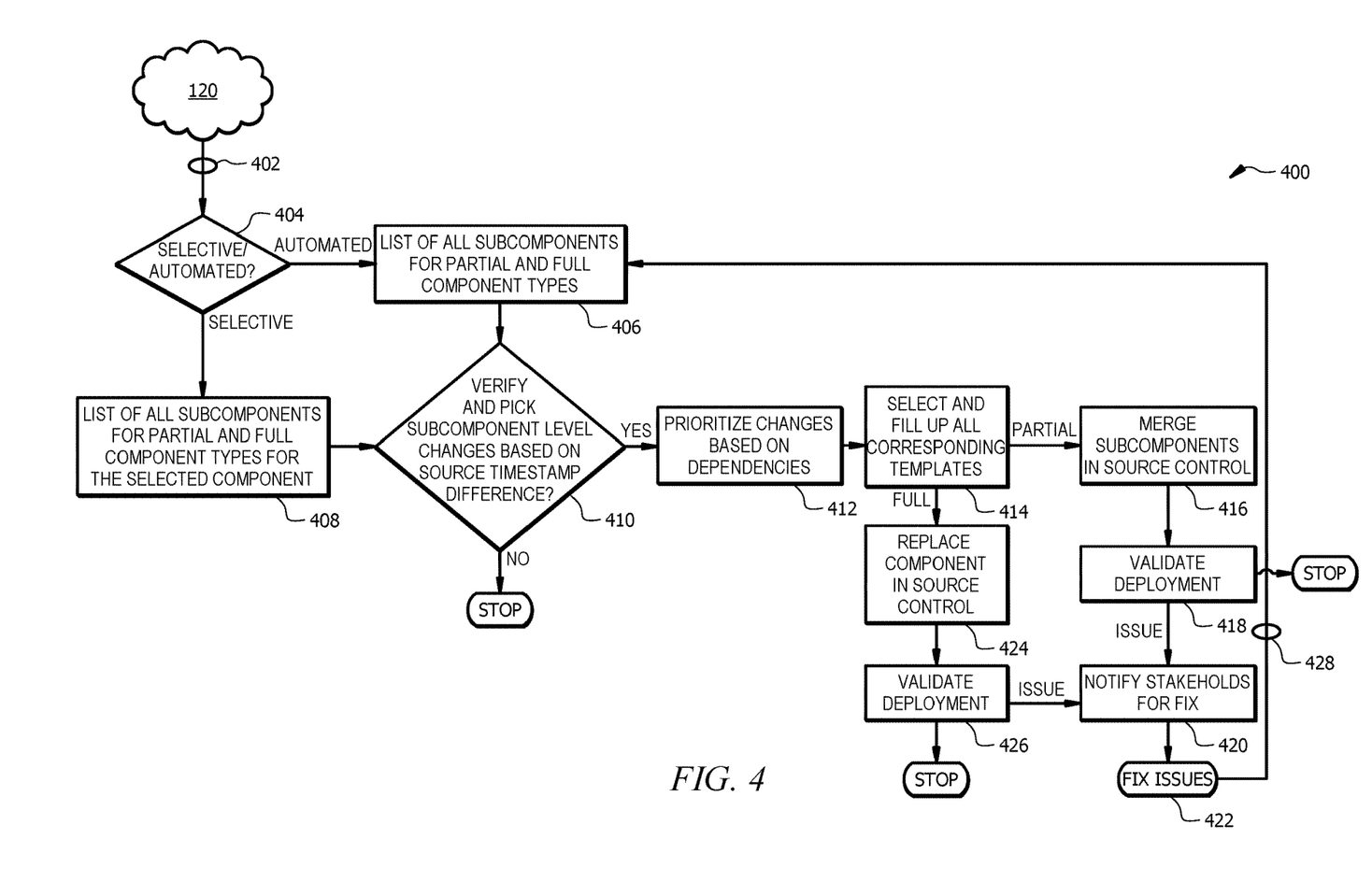
FIG. 4 is a flow chart showing an embodiment of a process to merge code from a cloud environment to a local system.

The flow chart in FIG. 4 presents an exemplary embodiment of method 400 of merging source code from a cloud environment 110 to a master copy in a source control 120 using system 100. In step 402, a user of system 100 selects a cloud environment 110 for system 100 to act on. At step 404, the user chooses whether system 100 will perform a selective operation or an automated operation. For a selective operation, the user manually selects which metadata artifact components 114 will undergo a full merge operation and which metadata artifact components 114 will undergo a partial merge operation. For automated operation, system 100 analyzes the metadata artifact components 114 and determines whether a given component should undergo a full merge operation or a partial merge operation, such as by referencing metadata settings table 200 shown in FIG. 2. Partial and full merge operations are discussed further in steps 416 and 424, respectively.

For automated operation, the system 100 proceeds to step 406, where extraction module 150 compiles a list of all metadata artifact components 114 that need to undergo a partial merge operation and a list of all metadata artifact components 114 that need to undergo a full merge operation. If the user instead chooses selective operation of system 100, then the system 100 proceeds to step 408, where the user inputs a list of metadata artifact components 114 that will undergo a partial merge operation and a list of all metadata artifact components 114 that will undergo a full merge operation.

At step 410, for both selective and automated operation, system 100 picks subcomponent level changes to merge into the master source code 122 based on a comparison of timestamps. This concept is best understood with reference to FIGS. 5A-B. FIG. 5A illustrates how changes are determined for a full merge operation. In this example, working source code 112 that is located in cloud environment 110 includes metadata artifact components 512, 518, and 524. Each of 512, 518, and 524 represent a different type of metadata artifact component 114 that is to undergo a full merge operation. Metadata artifact component 512 has an associated timestamp 514 that indicates when the last time the subcomponents 516 were updated. Metadata artifact component 518 has an associated timestamp 520 that indicates when the last time the subcomponents 522 were updated. Metadata artifact component 524 has an associated timestamp 526 that indicates when the last time the subcomponents 528 were updated.

In this example, master source code 122 is located in source control 120. Prior to the merge, master source code 122 includes the same metadata artifact component types 512 and 518 as working source code 112. The metadata artifact component 512 located in master source code 122 has an associated timestamp 514 that is the same as the corresponding metadata artifact component 512 located in the working source code 112. This indicates to system 100 that metadata artifact components 512 in both working source code 112 and master source code 122 have the same subcomponents 516. Therefore, system 100 will not make any changes to metadata artifact component 512 in master source code 122.

Prior to the merge, master source code 122 includes a metadata artifact component 518 like the working source code 112, but the timestamp 532 associated with the metadata artifact component 518 in master source code 122 is older than the timestamp 520 associated with the metadata artifact component 518 in working source code 112. This indicates to system 100 that metadata artifact component 518 needs to be updated in master source code 122. System 100 selects the subcomponents 522 of metadata artifact component 518 located in working source code 112 to be merged with master source code 122.

FIG. 5A also illustrates how system 100 handles step 410 when working source code 112 includes a metadata artifact component type not present in master source code 122. In FIG. 5A, working source code 112 has a metadata artifact component 524, which is comprised of subcomponents 528 that share a timestamp 526. Timestamp 526 is more recent than any of the timestamps 514 or 532 that are associated with components in master source code 122. This indicates to system 100 that metadata artifact component 524 needs to be added to master source code 122. System 100 selects the subcomponents 528 of metadata artifact component 524 to be merged with master source code 122. The updated subcomponents 522 and 528 now have new time stamps 536 and 538 that reflect the date and time of the merge operation.

FIG. 5B shows that changes in partial merge operations are determined in a similar manner. However, only some subcomponents of a given metadata artifact component are merged into the master source code at step 416 in a partial merge operation. Which subcomponents are selected is determined by reference to the metadata settings 142 located in the technical database 140. In this example, working source code 112 is located in cloud environment 110. Within working source code 112 is a metadata artifact component 552 that is made up of subcomponents 554, 556, and 558. Timestamps 560, 562, and 564 are associated with subcomponents 554, 556, and 558, respectively, to indicate when the subcomponents were last updated. Prior to the merge, master source code 122 in the source control 120 contains metadata artifact component 552 that is also made up of subcomponents 554, 556, and 558. The subcomponents 554, 556, and 558 located in master source code 122 have associated timestamps 560, 572, and 574 respectively. The timestamp associated with subcomponent 554 is the same in both the working source code 112 and master source code 122. Timestamps 572 and 574 are both older than the timestamps 562 and 564 that are associated with subcomponents 556 and 558, respectively, in working source code 112. This indicates to system 100 that the subcomponents 556 and 558 need to be updated in master source code 122. System 100 selects subcomponents 556 and 558 of metadata artifact component 552 located in working source code 112 to be merged with master source code 122.

Returning to FIG. 4, the system 100 proceeds through a prioritization operation at step 412. System 100 analyzes the components and subcomponents selected at step 410 to determine if the implementation of any of those components in the master source code 122 depends on the prior implementation of any other component selected at step 410. If it does, the components that depend on another component for implementation are given a lower priority and stored in priority cache 158. Analysis continues until a component is found that does not depend on prior implementation, in source control 120, of a different component. All such components are given first priority. The remaining components that were selected at step 410 are assigned a value based on the order in which they depend on components with first priority. Take, for example, a series of Components A, B, and C that were selected for merging at step 410. Implementation of Component A in source control 120 depends on prior implementation of Component B, which in turn depends on prior implementation of Component C. At step 412, system 100 determines from this data that Component C has first priority. Component B is then given a value of 2 and Component A is given a value of 3. The assigned values determine how the components are processed at step 414. Copies of the components given first priority are advanced to step 414. Copies of those components given a higher number value are stored in priority cache 158 for further processing. These components are advanced to step 414 in ascending order of the number values assigned for their priority.

Figure 6:
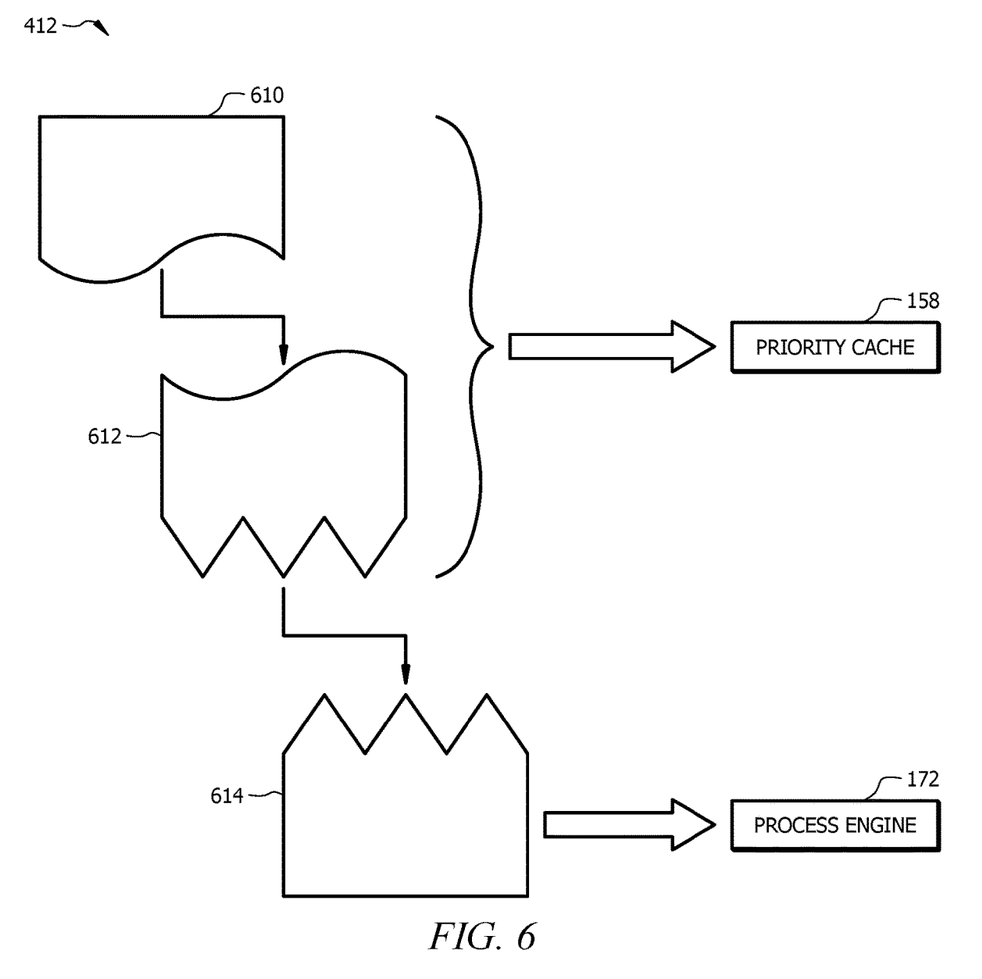
FIG. 6 is a diagram illustrating the prioritization step performed in the process of FIG. 4.

FIG. 6 illustrates this process. In FIG. 6, system 100 determines that component 610 cannot function until component 612 is implemented. The system further determines that component 612 cannot function until component 614 is implemented. Component 614 is assigned first priority and sent to process engine 172 where step 414 occurs. Components 610 and 612 are sent to priority cache 158 to await further processing. After component 614 proceeds through the merging process, component 612 will be retrieved from priority cache 158 and allowed to progress through the merging process. Finally, after component 612 proceeds through the merging process, component 610 is retrieved from the priority cache and allowed to progress through the merging process.

Returning to FIG. 4, at step 414, system 100 selects a metadata template 144 for the metadata artifact component or subcomponents received. The metadata artifact component or subcomponents are applied to the metadata template 144. The templated component then advances to step 416 or step 424 depending upon whether it is to undergo a partial merge operation or a full merge operation, respectively.

For a full merge operation, the templated components are merged into the master source code at step 424. FIG. 5A provides an example of a full merge operation as performed at step 424. In step 410, subcomponents 522 of metadata artifact component 518 located in working source code 112 and subcomponents 528 of metadata artifact component 525 were selected by system 100 to be merged with master source code 122. The merging of subcomponents 522 from working source code 112 into master source code 122 involves replacing the subcomponents 534 in metadata artifact component 518 located in the master source code 122. The master source code 122 after the merge operation of step 424 now has a metadata artifact component 518 comprised of subcomponents 522. The merging of subcomponents 528 from working source code 112 into master source code 122 involves adding a copy of metadata artifact component 524 to master source code 122.

FIG. 5B provides an example of a partial merge operation as performed at step 416. In this example, subcomponents 556 and 558 were selected by system 100 to be merged with metadata artifact component 552 in master source code 122. The merging of subcomponents 556 and 558 with master source code 122 involves replacing the version of subcomponents 556 and 558 that have associated timestamps of 572 and 574 in master source code 122 with the versions of subcomponents 556 and 558 that have associated timestamps of 562 and 564 in working source code 112. The updated versions of subcomponents 556 and 558 in master source code 122 now have time stamps that reflect the date and time of the partial merge operation.

Returning to FIG. 4, system 100 proceeds to either validation step 418 or 426 after steps 416 and 424, respectively. Deployment of the templated components and subcomponents is validated by comparing the merged master source code 122 with the working source code 112 in cloud environment 110. This involves repeating the timestamp comparisons made at step 410. If system 100 does not determine that any metadata artifacts 124 or any of their subcomponents 126 need to be changed in master source code 122, then method 400 concludes. If the deployment of the templated components and subcomponents is not validated, system 100 proceeds to step 420, notifying the user that an error has occurred so that the issue may be fixed.

At step 422, the user can make manual adjustments to the merging process or allow system 100 to automatically fix the issue. For example, if a user wants to manually fix the issue they can upload a revised metadata template 144 to be used in the next cycle of method 400. The issue can alternatively be fixed automatically by system 100 at step 428. For example, system 100 can automatically generate a revised metadata template 144 for those metadata artifact components 114 and subcomponents 116 that did not successfully merge with the master source code 122. System 100 then uploads the modified templates to technical database 140 before restarting method 400 at step 406 or step 408. Method 400 reiterates until step 410 results in a stop.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A code merging system, comprising: a first memory operable to store:
a set of metadata settings comprising at least one of a component type and a merge type;
a second memory operable to store a first set of code;
one or more processors operably coupled to a cloud computing environment, the first memory, and the second memory, and configured to implement: a metadata extraction engine configured to:
read metadata artifacts in the cloud computing environment, wherein the metadata artifacts comprise a plurality of components and subcomponents of a second set of code;
for a first metadata artifact component:
determine that the first metadata artifact component is of a type that undergoes a full merge operation when merged with the first set of code, wherein the full merge operation comprises replacing every subcomponent of a corresponding metadata artifact component in the first set of code with a copy of the subcomponents of the first metadata artifact component;
send a copy of the first metadata artifact component to a process engine that is implemented on a processor; for a second metadata artifact component:
determine that the second metadata artifact component is of a type that undergoes a partial merge operation when merged with the first set of code, wherein the partial merge operation comprises replacing some, but not all, of the subcomponents of a corresponding metadata artifact component in the first set of code with some of the subcomponents of the second metadata artifact component;
send a copy of a first subcomponent to a process engine that is implemented on a processor;
the process engine configured to:
perform a full merge operation by replacing, in the first set of code, a metadata artifact component that is of the same type as the first metadata artifact component with the copy of the first metadata artifact component; and
perform a partial merge operation by replacing, in the first set of code, a subcomponent that is of the same type as the first subcomponent with the copy of the first subcomponent.

2. The system of claim 1, wherein the first memory is further operable to store a set of metadata templates; and
the metadata extraction engine is further configured to, prior to sending the copy of the first metadata artifact component to the process engine:
determine that the operation of a third metadata artifact component in the second set of code depends upon prior implementation of the first metadata artifact component; and send a copy of the third metadata artifact component to a cache.

3. The system of claim 1, further comprising a cache, and wherein:
the first memory is further operable to store a set of metadata templates; and
the metadata extraction engine is further configured to, prior to sending the copy of the first subcomponent to the process engine:
determine that the operation of a second subcomponent in the second set of code depends upon prior implementation of the first subcomponent; and
send a copy of the second subcomponent to the cache.

4. The system of claim 1, wherein the one or more processors are further configured to implement a semi-supervised machine learning engine, wherein the semi-supervised machine learning engine is configured to generate a metadata artifact template for merging a previously unknown type of metadata artifact component with the first set of code.

5. The system of claim 1, wherein the one or more processors are further configured to implement a selection module, wherein the selection module is configured to receive user instructions that comprise:
a list of metadata artifact components to undergo a full merge operation; and
a list of metadata artifact components that will undergo a partial merge operation.

6. The system of claim 1, wherein the component type includes at least one of an object, a profile, a class, a page, a trigger, a permission set, a layout, a homepage component, an email, and a workflow.

7. The system of claim 1, wherein the process engine is further configured to validate that the partial merge and full merge operations were successful.

8. A method for merging source code, comprising: for a first metadata artifact component of a first set of code located in a cloud environment:
- determining, by a first processor, that the first metadata artifact component is of a type that undergoes a full merge operation when merged with a second set of code located in a first memory, wherein the full merge operation comprises replacing every subcomponent of a corresponding metadata artifact component in the second set of code with a copy of the subcomponents of the first metadata artifact component;
- sending, by the first processor, a copy of the first metadata artifact component to a process engine that is implemented on a second processor;
- completing, by the process engine, the full merge operation by replacing, in the second set of code, a metadata artifact component that is of the same type as the first metadata artifact component with the copy of the first metadata artifact component;

for a second metadata artifact component of the first set of code located in the cloud environment:
- determining, by the first processor, that the second metadata artifact component is of a type that undergoes a partial merge operation when merged with the second set of code located in the first memory, wherein the partial merge operation comprises replacing some, but not all, of the subcomponents of a corresponding metadata artifact component in the second set of code with some of the subcomponents of the second metadata artifact component;
- sending, by the first processor, a copy of a first subcomponent to the process engine that is implemented on the second processor;
- completing, by the process engine, the partial merge operation by replacing, in the second set of code, a subcomponent that is of the same type as the first subcomponent with the copy of the first subcomponent.

9. The method of claim 8, further comprising:
prior to sending the copy of the first metadata artifact component to the process engine,
- determining, by the first processor, that the operation of a third metadata artifact component in the second set of code depends upon prior implementation of the first metadata artifact component; and
- sending, by the first processor, a copy of the third metadata artifact component to a cache.

10. The method of claim 8, further comprising:
prior to sending the copy of the first subcomponent to the process engine,
determining, by the first processor, that the operation of a second subcomponent in the second set of code depends upon prior implementation of the first subcomponent; and sending, by the first processor, a copy of the second subcomponent to a cache.

11. The method of claim 8, further comprising:
prior to completing the full merge operation,
- selecting, by the second processor, a metadata template from a plurality of metadata templates stored in a second memory; and
- applying, by the second processor, the selected metadata template to the copy of the first metadata artifact component, wherein the selected metadata template provides info on where the first metadata artifact component will be inserted in the second set of code.

12. The method of claim 8, further comprising:
prior to completing the partial merge operation,
- selecting, by the second processor, a metadata template from a plurality of metadata templates stored in a second memory; and
- applying, by the second processor, the selected metadata template to the copy of the first subcomponent, wherein the selected metadata template provides info on where the first subcomponent will be inserted in the second set of code.

13. The method of claim 8, further comprising: training, with a semi-supervised machine learning algorithm, the first processor how to recognize different types of metadata artifacts.

14. The method of claim 8, further comprising: generating, with a semi-supervised machine learning algorithm implemented on the first processor, a metadata template for merging a previously unknown type of metadata artifact component in the first set of code with the second set of code.

15. A source code merging device, comprising one or more processors configured to implement:
a metadata extraction engine configured to:
- read metadata artifacts in a cloud environment, wherein the metadata artifacts comprise a plurality of components and subcomponents of a first set of code;
for a first metadata artifact component:
- determine that the first metadata artifact component is of a type that undergoes a full merge operation when merged with a second set of code located in a second memory, wherein the full merge operation comprises replacing every subcomponent of a corresponding metadata artifact component in the second set of code with a copy of the subcomponents of the first metadata artifact component;
- send a copy of the first metadata artifact component to a process engine that is implemented on a processor; for a second metadata artifact component:
- determine that the second metadata artifact component is of a type that undergoes a partial merge operation when merged with the second set of code, wherein the partial merge operation comprises replacing some, but not all, of the subcomponents of a corresponding metadata artifact component in the second set of code with a corresponding set of the subcomponents of the second metadata artifact component;
- send a copy of a first subcomponent to a process engine that is implemented on a processor; the process engine configured to:
- perform a full merge operation by replacing, in the second set of code, a metadata artifact component that is of the same type as the first metadata artifact component with the copy of the first metadata artifact component; and
- perform a partial merge operation by replacing, in the second set of code, a subcomponent that is of the same type as the first subcomponent with the copy of the first subcomponent.

16. The device of claim 15, further comprising a cache, and wherein:
the metadata extraction engine is further configured to, prior to sending a copy of the first metadata artifact component to the process engine:
- determine that the operation of a third metadata artifact component in the first set of code depends upon implementation of the first metadata artifact component; and send a copy of the third metadata artifact component to the cache.

17. The device of claim 15, further comprising a cache, and wherein:
the metadata extraction engine is further configured to, prior to sending a copy of the first subcomponent to the process engine:
determine that the operation of a second subcomponent in the first set of code depends upon prior implementation of the first subcomponent; and
send a copy of the second subcomponent to the cache.

18. The device of claim 15, wherein the one or more processors are further configured to implement a semi-supervised machine learning engine, wherein the semi-supervised machine learning engine is configured to generate a metadata artifact template for merging a previously unknown type of metadata artifact component with the first set of code.

19. The device of claim 15, wherein the one or more processors are further configured to implement a selection module, wherein the selection module is configured to receive user instructions that comprise:
a list of metadata artifact components to undergo a full merge operation; and
a list of metadata artifact components that will undergo a partial merge operation.

20. The device of claim 15, wherein the process engine is further configured to validate that the partial merge and full merge operations were successful.

* * * * *